S. T. Parmelee,
Belting Machine.
N°23,779.   Patented Apr. 26, 1859.
2 Sheets—Sheet 1.
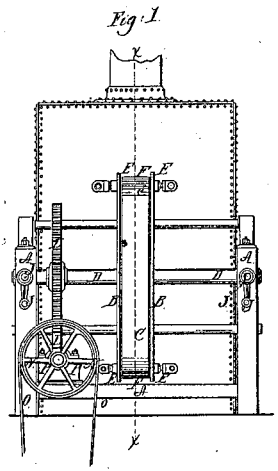
Fig. 1.
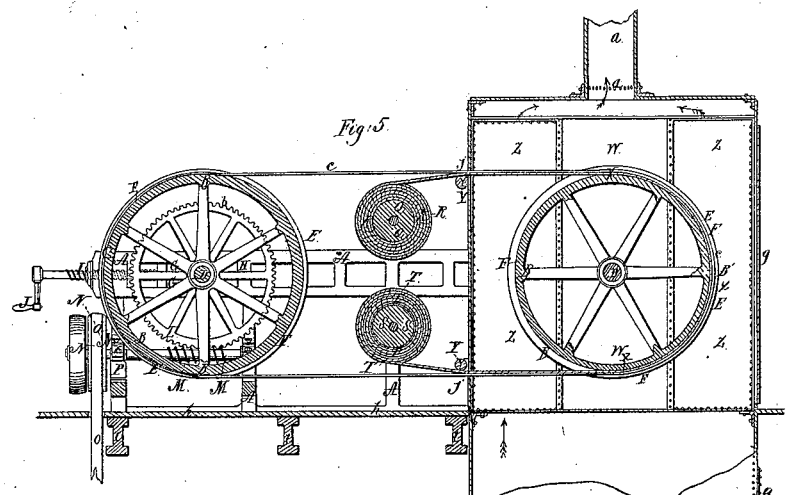
Fig. 5.
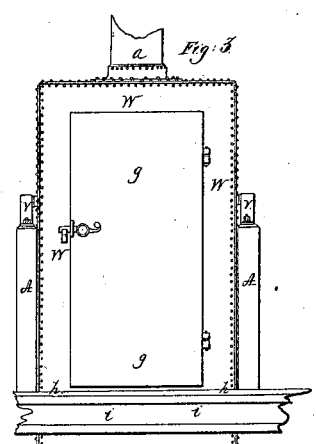
Fig. 3.
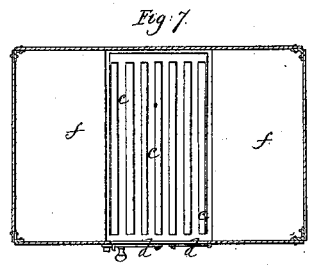
Fig. 7.
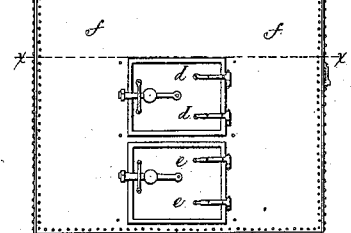
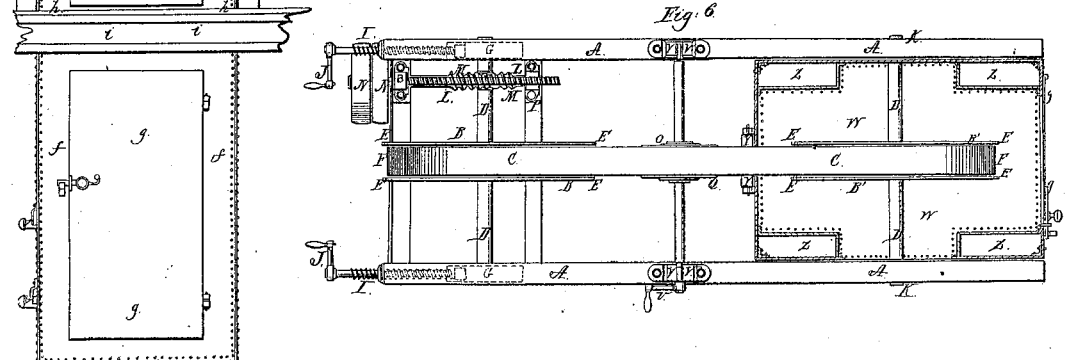
Fig. 6.
Witnesses:
Inventor:
Spencer T. Parmelee S. T. Parmelee,
Belting Machine.
N°23,779. Patented Apr. 26, 1859.
2 Sheets. Sheet 2.
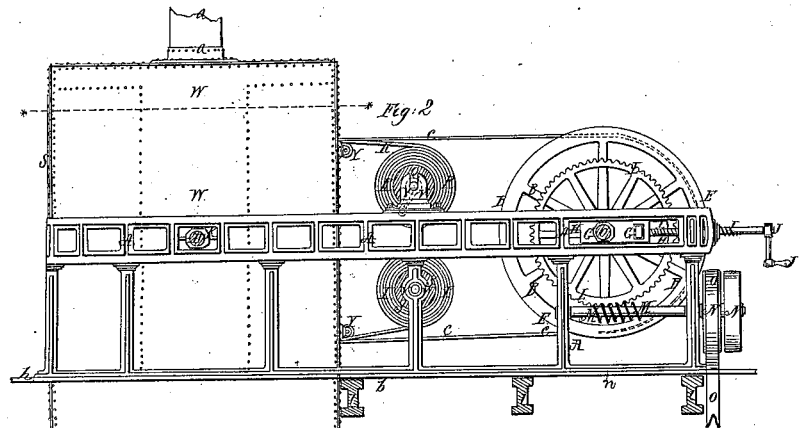
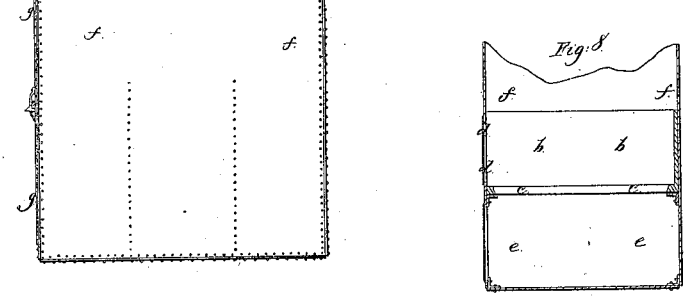
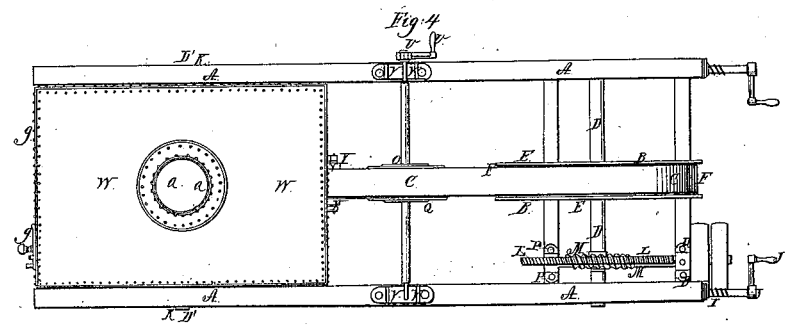
Witnesses:
Inventor:
Spencer T. Parmelee

UNITED STATES PATENT OFFICE.

SPENCER THOS. PARMELEE, OF EDINBURGH, SCOTLAND.

MANUFACTURE OF ELASTIC BELTING.

Specification of Letters Patent No. 23,779, dated April 26, 1859.

*To all whom it may concern:*

Be it known that I, SPENCER THOMAS PARMELEE, a citizen of the United States, now residing in Edinburgh, in the county of Mid-Lothian, in that part of the United Kingdom of Great Britain and Irleand called "Scotland," have invented a new and useful Improvement in the Manufacture of India-Rubber and Gutta-Percha Belting for Machinery and other Purposes; and I do hereby declare that the following is a full, clear, and exact description of the same, reference being had to the accompanying drawings, making a part of this specification.

This invention relates to the manufacture of belting to be employed for the general purposes of communicating motion to or from machinery, traces, girthings or otherwise, by uniting two or more layers of woven material of any required width spread or coated on both sides with india-rubber, gutta percha, or a combination of both, properly prepared for vulcanization, and subsequently subjecting them to the requisite heat to effect vulcanization; and my improvement consists in submitting the said belting to pressure between the periphery of one of two revolving cylinders or drums and an endless metallic band which passes around and moves with the said cylinders or drums; the said cylinders or drums being provided each with one or more grooves corresponding to the width of the belting; and the cylinder or drum between which and the endless metallic band the belt passes, being inclosed within the heating or vulcanizing chamber. By this means the several layers of which the belting is composed are caused to be more perfectly united and the materials to be more effectually consolidated, and the surfaces of the said belting are rendered more even and regular than in the belting manufactured in the usual way.

Figure 1 in the accompanying drawing represents a front end view of the principal portions of the apparatus employed in operating as above mentioned; Fig. 2 is a side view of the apparatus complete; Fig. 3 a back view of the same; Fig. 4 a plan or top view; Fig. 5 a longitudinal vertical section taken through the dotted line $x, x$, in Fig. 1; Fig. 6 a horizontal section taken through the dotted line *, *, in Fig. 2; Fig. 7 a horizontal section of the furnace, taken through the dotted line $x, x$, in Fig. 5, showing the arrangement of the firebars; Fig. 8 a transverse vertical section of the same.

Similar letters represent similar parts.

A, A, is the framing upon which the working portions of the machinery are mounted.

B, B, are the cylinders or drums, and C, C, the endless metallic band; said cylinders or drums being secured to two horizontal shafts D, and D'.

E, E, are side flanges or shoulders forming grooves F, F, on the peripheries of the cylinders, of corresponding width to the belting, and in which grooves the endless metallic band C, C, which is of corresponding width revolves.

G, G, are the bearings for the shaft D, of the cylinder B, applied so as to be adjustable horizontally in slots H, H, formed in the framing for the purpose of enabling the necessary running pressure to be given to the endless metallic band, by screws and nuts I, I, actuated by winch handles J, J.

K, K, are fixed bearings in which the shaft of the cylinder B revolves.

L, L, is a worm wheel secured to the shaft D', of the cylinder B', for the purpose of receiving motion from the endless screw M, M, whose shaft works in bearings P, P, in the frame A.

N, N, are a fast and a loose pulley on the shaft of the screw M, M; and O, a belt running from a steam engine or other motor to said pulleys to drive said screw.

Q, is a roller upon which the belt R, R, to be operated upon is wound; and S, is another roller arranged like Q, in suitable fixed bearings V, V, on the framing A, A, to receive the vulcanized belting, said roller S, being operated by a winch handle or by gearing from the shaft D.

W, is the vulcanizing chamber or case inclosing the cylinder B', for the purpose of keeping the belting X, X, between the cylinder B', and the band C, heated.

Y, Y, are rollers secured to the front of the chamber W, for the purpose of directing the belting through openings $j, j'$, in said chamber to and from the inclosed cylinder B, the same openings serving for the passage of the endless metallic band.

Z, Z, are heating flues passing vertically through the vulcanizing chamber W, from the lower chamber $f, f$, which surrounds the furnace $b, b$. $c, c$, are the firebars of said furnace; $d, d$, is the furnace door; and $e, e$, the ashpit; $g, g$, are doors opening from the vulcanizing chamber W, and lower chamber $f$.

$h, h$, is the flooring by which the framing A, is supported; and $i, i$, are the joists or girders supporting said floor.

To operate upon the belting by this apparatus, the vulcanizing chamber requires to be heated by the furnace or otherwise to about the temperature generally employed for vulcanization, viz., about 270° F. and one end of the belt to be vulcanized is drawn from the roller Q, and passed between the rollers Y, and metallic band C, and through the opening $j$, into the heated chamber, and placed between the metallic band and the cylinder B′, to which latter a rotary motion is imparted through the agency of the metallic band from the cylinder B. The motion of the metallic band and cylinder is of such velocity that the belting having traveled one half of the circumference of the cylinder B′, becomes vulcanized; the motion and heat being maintained until the whole length of the belting supplied by the roller R, has passed the cylinder B′, and the necessary pressure between the metallic band and said cylinder being given during the whole of the process by the screws I, I.

What I claim as my invention and desire to secure by Letters-Patent is:—

Submitting the belting, while within the heating or vulcanizing chamber, to pressure between the smooth surfaces of an endless metallic band and one of two revolving metallic cylinders around which the said band passes, substantially as herein set forth.

SPENCER T. PARMELEE.

Witnesses:
JAMES McQUADE,
C. MEYER.